United States Patent Office 2,933,404
Patented Apr. 19, 1960

2,933,404

FLUOBORATE GLASS

Paul F. De Paolis, Rochester, N.Y., assignor to Eastman Kodak Company, Rochester, N.Y., a corporation of New Jersey No Drawing. Application July 21, 1958
Serial No. 749,648

4 Claims. (Cl. 106—54)

This is a continuation-in-part of my application Serial No. 519,640, filed July 1, 1955, and now abandoned.

This invention relates to optical glass and particularly to fluoborate glass of the type described in U.S. Patent 2,456,033, Sun.

The object of the present invention is to produce a glass having optical characteristics similar to that of the glasses described in the Sun patent but having superior qualities with respect to producibility without devitrification and workability, such as the ability to be easily ground and polished. The glass according to the present invention also has highly acceptable properties with respect to clarity and resistance to weathering.

It is a particular object of the invention to produce a glass which will have exceptionally high Abbe V value for a given index. Normally, in this region the most extreme commercial glasses are $$N_D = 1.62$$
$$V = 60.3$$

The glasses according to the present invention run $$N_D = 1.62$$
$$V = 62-63$$

Although they are thus more extreme in optical position (on the refraction-dispersion chart), these glasses are much more resistant to the stain and etching usually suffered by the commercial glasses in this region.

Another way of describing the objects of the present invention is to point out that the present glass is not only an improved form of the glass described in the Sun patent above but may also be considered an improved form of standard barium crown glasses. The present invention gives all of the advantages of both types of glass and also reduces the shortcomings of both types. With respect to staining and etching, it is better than either of the prior glasses.

The partials (partial dispersions) of the new glasses are comparable to the best dense barium crown glasses even though the Abbe V value is higher. The new glasses are amenable to the usual optical shop processes of grinding, polishing, coating and annealing without special treatment, whereas the glasses of Sun require delicate care in each of these operations to prevent breakage and crystallization and to insure high optical quality (smoothness) of the polished surface.

According to the present invention these advantages are obtained by the introduction of a high percentage of fluoride, particularly by the introduction of lithium fluoride in a glass consisting primarily of lanthanum, barium, boron and silicon oxides. A preferred embodiment of the invention has the barium present partly as barium fluoride. Similarly, the lanthanum may be introduced partly as lanthanum fluoride although the boron is always, and the silicon is usually, present as oxide. There should be a high percentage of lithium fluoride although lithium oxide may also be added. The preferred embodiment of the invention also has a trace of aluminum introduced usually as aluminum oxide. Other materials compatible with the above materials may, of course, be introduced in small quantities as is common in the glass-making industry.

Or starting with the Sun patent mentioned above, the present invention introduces silica and then to restore the optical properties introduces lanthanum. Further according to the invention a certain percentage of lithium is required when a high percentage of lanthanum is thus introduced into a glass of this type.

The percentages of the various materials must be within certain ranges to obtain the optimum effect of the present invention. The batch from which the glass is fused consists entirely of oxides and fluorides, the total fluorides being between 10 and 40% by weight, of which at least 1% is lithium fluoride. The total lithium compounds should be between 1 and 10% by weight, the total boron oxide between 15 and 40%, the total silicon compounds between 5 and 25%, the total barium compounds between 20 and 60%, the total lanthanum compounds between 5 and 25%. In the preferred embodiment aluminum compound, usually aluminum oxide, is present between .2 and 2%.

In common with the glasses of the Sun patent the following factors are present in the method of manufacture:

In general, it takes about one and one half hours to melt down the oxide components of a 500-gram melt to fluid liquid or liquids at about 1250° C. The solution of fluorides takes about 10 minutes with stirring. The liquid glass is usually fluid at about 1200° C. At this temperature the volatilization loss is almost unnoticeable. However, it would be best to cover the melting pot during melting and stirring period. The glass can be poured after about one half hour's stirring at somewhat lower temperature. The best molding temperatures are between 450–650° C. though 550° C. would be suitable for most cases. These glasses are colorless and durable against moisture attack.

It will be noticed that the above process is exactly that recommended for the Sun glasses. If one wanted to keep volatilization of the fluorides to an absolute minimum this is still the most preferred process. However, in practice one does not have to be quite this careful with the present glasses, because the added silica not only gives the highly desirable properties to the finished glass as discussed above, but also tends to hold down volatilization of the fluorides during melting and stirring. This added tolerance can be put to advantage as follows:

When making up larger batches, and particularly when it is desirable to operate somewhat faster, the melting temperature is preferably raised to between 1350° C. and 1400° C. Stirring can still be done at 1200° C. 1260° C. is actually used because it happens to be the standard temperature at which production equipment happens to be already set for stirring of other production glasses such as high index borates. This point is mentioned to emphasize that there is nothing very critical about temperatures in glass manufacture. One always fuses the components of a glass by raising them above the fusing temperature and then stirs them at a temperature at which they are still liquid, and of course above the point at which crystals start to form. Since volatilization is lower, it is possible to stir without a cover in some cases, but it is still better to use a closed system (a cover) as recommended in the Sun patent.

The pouring temperature used with the present glass happens to be slightly higher than with those described by Sun, because the silica increases the viscosity. Temperatures a little less than 1000° C. have proved quite satisfactory, although of course, this is not a critical temperature. Sun does not specify his pouring temperature; it could be the same as this or somewhat lower for his less viscous examples. Molding or pressing of the glass can conveniently be done at 550° C. as specified above, but again it is faster and more usual to work at slightly higher temperatures because of the presence of silica. Annealing temperatures, not specified in the Sun patent run about 480° C. for the present glass. There is nothing unusual in any of this; molding and annealing of any glass are always near the softening range of the glass.

The presence of silica decreases any tendency toward crystallization or any tendency toward striae as compared to prior fluoborate glasses of the Sun type and the fluoboroates improve the optical properties compared to any prior glasses of the barium crown type. Lowering of the refractive and dispersive indices by the addition of silica (to the glasses of Sun) is corrected by adjusting the barium and lanthanum contents (which adjustment was found to require lithium). One very surprising thing was that when the refractive and dispersive indices were thus brought back to fluoborate values, the partial dispersion was also brought back fully to its highly desirable value and was not spoiled by the silica.

The following table shows two examples of glass batches according to the present invention:

|  | Example I | Example II |
|---|---|---|
| $B_2O_3$ | 26.7 | 28 |
| $BiO_2$ | 15.4 | 10 |
| BaO | 24.8 | 43 |
| $BaF_2$ | 16.0 |  |
| $La_2O_3$ | 12.5 | 6 |
| $LaF_3$ |  | 6 |
| $Li_2O$ |  | 2 |
| LiF | 3.8 | 4 |
| $Al_2O_3$ | .8 |  |
| $CaF_2$ |  | 1 |

The above table gives the composition in percentages by weight.

Example I shows the preferred embodiment of the invention which gives a glass having an index of refraction $N_D$ of 1.622 and a dispersion index V of 62.7. This glass is a thoroughly practical one both from the point of view of manufacturing and from the point of view of use in the optical industry.

This Example I has a partial dispersion VgF of .538 which corresponds exactly to the value for one of the Sun examples. Thus the addition of silica has not spoiled the highly desirable optical properties of the Sun glass. However, it has improved the practical features of the glass and made it at least as good, and in some respects better, than standard barium crown glass. The present glass can be manufactured and can be used in the manufacture of lenses free of crystallization, striae, deterioration under weathering etc. and with respect to these latter qualities it is better than any prior glass having the same optical characteristics.

Example II represents an average example selected from various other glasses according to the present invention and illustrates the fact that the barium may be present entirely as barium oxide in a quite high percentage and that the fluoride may be partly of lanthanum fluoride or calcium fluoride in addition to the lithium fluoride. The essential feature is the addition of lithium fluoride and some other fluoride to a glass consisting primarily of boron, silicon, barium and lanthanum oxides.

I claim:

1. A fluoborate glass resulting from fusion of a batch consisting essentially in percent by weight of lithium fluoride 1 to 10 percent, boron oxide 15 to 40 percent, silicon dioxide 5 to 25 percent, barium oxide plus barium fluoride 20 to 60 percent, lanthanum oxide plus lanthanum fluoride 5 to 25 percent and the total fluorides 10 to 40 percent.

2. A fluorborate glass resulting from fusion of a batch consisting of oxides and fluorides and consisting essentially of oxides and fluorides of the following elements in percent by weight lithium 1 to 10 percent, boron 15 to 40 percent, silicon 5 to 25 percent, barium 20 to 60 percent, lanthanum 5 to 25 percent the total fluorides 10 to 40 percent, the boron being present only as boron oxide and at least 1 percent of the lithium being present as lithium fluoride.

3. A fluoborate glass according to claim 2 containing aluminum .2 to 2 percent.

4. A fluoborate glass according to claim 2 in which the lithium is present in the batch only as lithium fluoride, the silicon only as silicon oxide and the lanthanum only as lanthanum oxide.

References Cited in the file of this patent

UNITED STATES PATENTS

| 2,456,033 | Sun | Dec. 14, 1948 |
| 2,764,492 | Weissenberg | Sept. 25, 1956 |